United States Patent Office 3,225,036
Patented Dec. 21, 1965

3,225,036
6-METHYL-16-FLUORINATED STEROIDS
Gerald D. Laubach, Niantic, Conn., assignor to Chas. Pfizer & Co., Inc., Brooklyn, N.Y., a corporation of Delaware
No Drawing. Filed Nov. 2, 1959, Ser. No. 850,108
13 Claims. (Cl. 260—239.55)

The present invention relates to steroid compounds and is more particularly concerned with 16β-fluorinated corticosteroids and 21-esters thereof, to novel intermediates in the production thereof and a process for the production of the novel compounds and the novel intermediates.

This application is a continuation-in-part of our earlier filed copending United States patent application Serial Number 801,000; filed March 23, 1959, and now abandoned.

It has now been found that 6α-methyl-16β-fluorinated corticosteroids and the 21-esters thereof possess valuable anti-inflammatory, anti-rheumatoid arthritic and glucocorticoid activities to a remarkable degree. The 6α-methyl-16β-fluorinated corticosteroids of this invention have been found to possess these valuable therapeutic activities to a much higher degree than the heretofore available 16-halogenated corticosteroids.

These compounds are also useful in the treatment of inflammatory conditions of the skin, ears, and eyes of humans and of valuable domestic animals as well as contact dermatitis and other allergic reactions. Compositions containing the valuable compounds of the present invention can be prepared for administration to humans or animals in conventional dosage forms, such as, pills, tablets, capsules, solutions, elixirs or syrups for oral use, or in liquid forms which are adaptable to the natural and synthetic cortical steroid hormones for injectible products. The novel steroids can also be administered topically in the form of ointments, creams, and the like.

The fluoro atom can be easily and economically introduced into the 16β-position of the steroid molecule to give 16β-fluorinated steroids which possess the complete corticosteroid side chain. The essential feature of the process of this invention resides in protecting the corticosteroid side chain of, for example, a 16β-bromo corticosteroid by conversion to the 17,20; 20,21-bismethylenedioxy derivative. The thus protected compound is then reacted with silver fluoride to give the corresponding 16β-fluorinated corticosteroid - bismethylenedioxy derivative from which the bismethylenedioxy function can easily be removed as is described in our copending and concurrently filed patent applications which issued respectively April 18, 1961, and February 20, 1962, as U.S. Patents 2,980,670 and 3,022,297. In these applications we described 16β-fluorinated corticosteroids and 9α,16β-difluorinated corticosteroids respectively and processes for their production.

The novel compounds of the present invention may be illustrated by the generic formula:

and the Δ¹-dehydroanalogs thereof wherein X is selected from the group consisting of hydrogen and fluorine; B is selected from the group consisting of carbonyl and β-hydroxymethylene radicals; and the 21-acylates thereof wherein the acyl radical is that of a hydrocarbon carboxylic acid containing from one to eight carbon atoms, inclusive. The novel compounds of the present invention can be prepared by the following reaction sequence wherein the various symbols have the same significance as above:

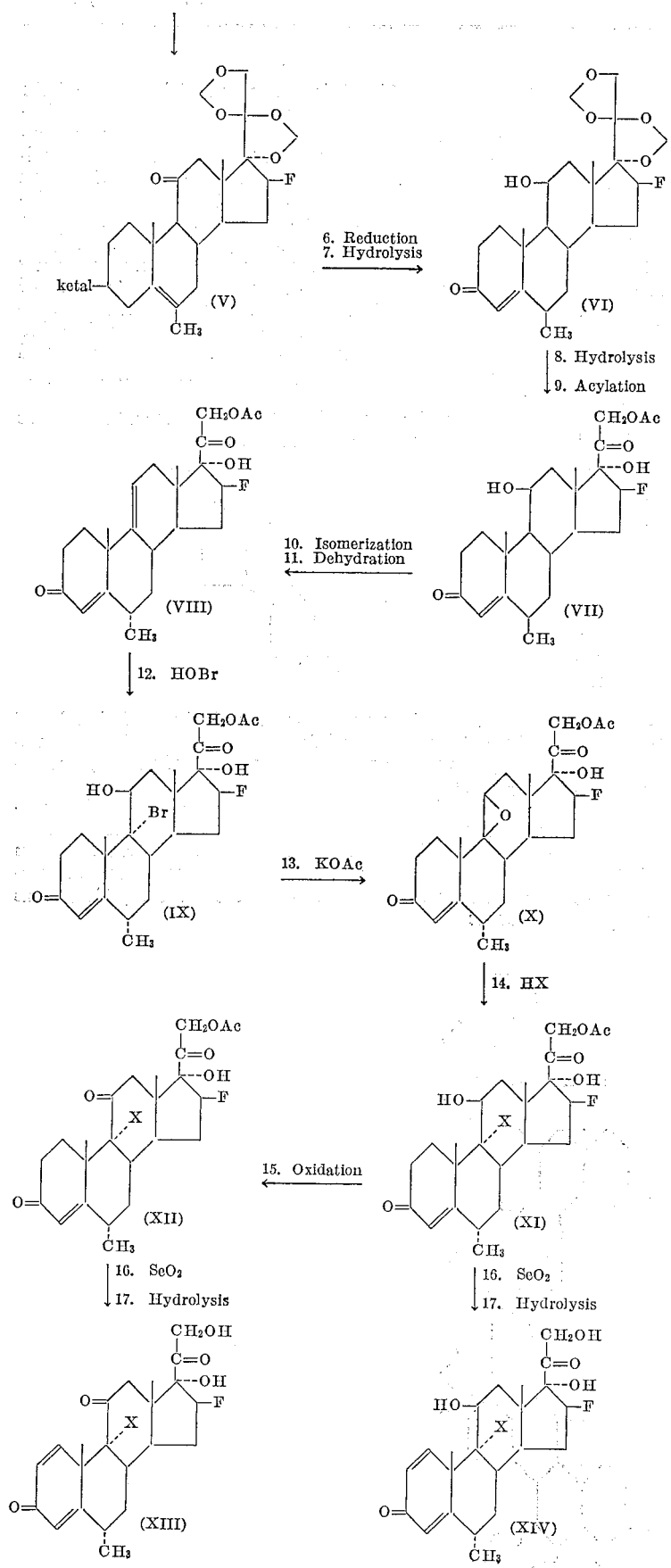

The process of the present invention for preparing 6α-methyl,16β-fluorinated corticosteroids is practiced in general by utilizing as starting material the 17,20; 20,21-bismethylenedioxy derivative of 3,20-diketo-5α,6α-oxido-11α,17α,21-trihydroxy - 16β-fluoro pregnane 3 - ethylene ketal 11-acylate (I) which can be prepared as disclosed in our copending and concurrently filed patent application, which issued February 20, 1962, as U.S. Patent No. 3,022,295, entitled, "6,16-Difluorinated Corticosteroids," which describes the preparation of 6α,16β-difluorinated corticosteroids. Treatment of the 5α,6α-oxide with methyl magnesium bromide produces the corresponding 5α-hydroxy-6β-methyl compound (II). Removal of the ketal and 11-acyl groups by hydrolysis with acid followed by oxidation gives the 17,20; 20,21-bismethylenedioxy derivative of 3,11,20-triketo-5,17α,21-trihydroxy-6β-methyl-16β-fluoro allopregnane (III). Dehydration at the 4,5-positions produces the 17,20; 20,21-bismethylenedioxy derivative of 6β-methyl-16β-fluorocortisone (IV) which is then converted to the corresponding 3-ketal derivative by reaction with a 1,2- or 1,3-alkylene glycol (V). Reduction of said ketal gives the corresponding hydrocortisone compound which is then hydrolysed to produce 6β-methyl-16β-fluoro-hydrocortisone-17,20; 20,21-bismethylenedioxy derivative (VI). Removal of the bismethylenedioxy function of said hydrocortisone compound followed by acylation produces 6β-methyl-16β-fluoro-hydrocortisone 21-acylate (VII). Isomerization of said 6β-methyl derivative gives the corresponding 6α-methyl-16β-fluoro-hydrocortisone 21 acylate which can then be oxidized to the corresponding 6α-methyl-16β-fluoro cortisone 21-acylate. Dehydrogenation of the thus-produced cortisone and hydrocortisone compounds produces the corresponding Δ¹-dehydro compounds. Dehydration of the said 6α-methyl-16β-fluoro-hydrocortisone 21-acylate (VII) at the 9,11-position yields the corresponding Δ⁴,⁹⁽¹¹⁾-pregnadiene compound (VIII) which, on treatment with a hypohalogenating agent produces the corresponding 6α-methyl-9α-halo-16β-fluoro-hydrocortisone 21-acylate (IX). Conversion of the thus produced halohydrin to the corresponding 9β,11β-oxide (X) followed by treatment with a halogenating agent, in which the halogen atom differs from that of the halohydrin precursor, produces the corresponding halohydrin (XI). Oxidation of the said 6α-methyl-9α-halo-16β-fluorohydrocortisone 21-acylate produces the corresponding cortisone compound (XII). Dehydrogenation of the said hydrocortisone and cortisone compounds gives the corresponding Δ¹-dehydro compounds (XIII and XIV).

As starting materials for the preparation of the novel compounds of this invention, the various 16β-fluorinated corticosteroids disclosed in our above mentioned copending and concurrently filed patent applications which issued respectively April 18, 1961, and February 20, 1962, as U.S. Patents 2,980,670 and 3,022,297 may be used. Such compounds include, for example, 16β-fluoro-11-desoxy hydrocortisone, its 21 esters and 17,20; 20,21-bismethylenedioxy derivative; 16β - fluoro-Δ⁴,⁹⁽¹¹⁾-pregnadiene-17α,21-diol-3,20-dione 21-acylate; 16-β-bromo-Δ⁴,⁹⁽¹¹⁾-pregnadiene-17α,21-diol-3,20-dione 21-acylate; 9α-halo-16β-fluoro-hydrocortisone, its 21 esters and 17,20; 20,21-bismethylenedioxy derivative.

Also included within the purview of this invention are modifications of the illustrated process which comprise using as starting material a compound obtainable as an intermediate product at any stage of the process and carrying out the remaining process steps. The order of the various steps can be varied considerably as will be recognized and appreciated by those skilled in the art.

It is an object of the present invention to provide novel 16β-fluorinated corticosteroids. A further object of this invention is to provide novel intermediates of the 16β-fluorinated corticosteroids of the instant invention. Another object of the present invention is to provide novel 6α-methyl-16β-fluorinated-17α,21-dihydroxy-3,20-diketo steroids. Still another object of the present invention is to provide a process for the production of these novel 6α-methyl-16β-fluorinated corticosteriods. Other objects will be apparent to those skilled in the art to which this invention pertains.

The 6α-methyl-16β-fluorinated corticosteriods of the present invention are produced by treatment of 3,20-diketo - 5α,6α-oxido - 11α,17α,21 - trihydroxy-16β-fluoro-17,20; 20,21-bismethylenedioxy allopregnane 3-ethylene ketal-11-acetate (I) with methylmagnesium bromide in ether-tetrahydrofuran. In the preferred embodiment of this invention, a well cooled ether-tetrahydrofuran solution of methyl magnesium bromide is treated with a cold ether-tetrahydrofuran solution of the 5α,6α-oxide. The mixture is allowed to stand for several hours at the end of which time the solvent is removed by distillation and the residue decomposed by the addition of ice-water. The 6β-methylated product (II) is isolated, if desired, by extraction with a suitable organic solvent followed by evaporation to dryness.

The hydrolysis step involves the conversion of the thus produced 3-ketalized-11α-acetoxy-6β-methylated compound to the corresponding 3-keto-11α-hydroxy compound. This reaction can be performed by treating can be performed by treating the 3-ketalized-11α-acetoxy derivative with dilute acid, such as, sulfuric acid, perchloric acid, under relatively mild conditions, e.g., at room temperature, for several hours. The 3-keto-11α-hydroxy compound is isolated by neutralizatioin with dilute aqueous sodium acetate or sodium bicarbonate followed by addition of water to precipitate the product.

The thus produced 3,20-diketo,5α,11α,17α,21-tetrahydroxy - 6β,methyl - 16β - fluoro - allopregnane - 17,20; 20,21-bismethylenedioxy derivative is then oxidized to the corresponding 11-keto compound by treatment in a suitable organic solvent with an oxidizing agent, such as, chromic acid, for a relatively brief period, generally about 15 to 60 minutes. In the preferred embodiment of this invention, an acetic acid solution of chromic acid is added to a solution of the 11-hydroxy compound in glacial acetic acid. After about a half-hour alcohol is added and the mixture concentrated to a syrup under reduced pressure. The desired 11-keto compound (III) is isolated with chloroform and recrystallized from aqueous alcohol.

In the dehydration step, the said 5α-hydroxy-6β-methyl-16β-fluoro compound (III) is dehydrated at the 4,5-positions in acid or alkaline media. Suitable acid dehydrating agents include mineral acids, such as, hydrochloric acid and sulphuric acid. In addition, acetic acid, acetic anhydride and paratoluenesulfonic acid serve as suitable dehydrating agents. Alkaline dehydrating agents include sodium, calcium and barium hydroxides. In the preferred embodiment of this invention, acid dehydration is employed, preferably in the presence of acetic acid or hydrochloric acid. Depending on the amount of acid used, the 6α- and 6β-isomers are obtained. The 6β-isomer rearranges in the presence of strong acids to the 6α-isomer.

Alternatively, the hydrolysis and dehydration steps may be accomplished concomitantly by dissolving the 17, 20; 20,21-bismethylenedioxy derivative of the 3-ketalized 3,20 - diketo - 5α,11α,17α,21 - tetrahydroxy - 6β - methyl-16β-fluoro-allopregnane 11-acetate (II) in an organic solvent, such as, chloroform and treating with an aqueous mineral acid. The solution is saturated with hydrogen chloride and shaken at about room temperature for from about 10 hours to about 20 hours. The reaction mixture is then washed with water and the solvent evaporated. The resulting 17,20; 20,21-bismethylenedioxy derivative of 3,20-diketo 5α,11α,17α,21-tetrahydroxy-6β-methyl-16β-fluoro-allopregnane is purified by recrystallization from a suitable organic solvent or by chromatography and then oxidized as described above to the corresponding 11-keto derivative (IV). Here also, the 6β- and 6α-isomers are obtained depending upon the amount of acid used. It is not necessary to separate the isomers. The reaction sequence can be performed as illustrated, since provisions for complete conversion to the 6α-isomer are included.

The bismethylenedioxy derivative of 6β-methyl-16β-fluoro-cortisone thus obtained is converted to the 3-alkylene ketal by reaction with a 1,2 or 1,3-glycol, such as, ethylene glycol 1,2-propanediol and 1,3-propanediol. In the preferred embodiment of this invention, the 16β-fluoro-bismethylenedioxy derivative is mixed with ethylene glycol, benzene and paratoluenesulfonic acid monohydrate and the mixture refluxed and stirred for several hours with continuous removal of water. Upon completion of the reaction, the solution is cooled and made basic by addition of 5% aqueous sodium carbonate. The aqueous solution is extracted with a 1:1 benzene-ether solution, the organic layers separated, dried over a suitable drying agent, filtered and evaporated to give the corresponding 3-ketalized-$\Delta^5$-pregnene compound (VI). The 3 - ketalized - 11 keto - 16β - fluoro - $\Delta^5$ - pregnene - 17, 20; 20,21-bismethylenedioxy derivative is reduced with a chemical carbonyl reducing agent, such as, sodium borohydride or lithium aluminum hydride, in an organic solvent to produce the corresponding 3-ketalized-11β-hydroxy - 16β - fluoro - $\Delta^5$ - pregnene - 17,20; 20,21 - bismethylenedioxy compound. In the preferred embodiment of this invention, the 3-ketalized-11-keto derivative is dissolved in ether and treated with an ethereal solution of sodium borohydride at about room temperature. Upon completion of this reaction, the reaction mixture is cautiously treated with water or a dilute mineral acid to decompose excess sodium borohydride and organometal complexes. The product is isolated by filtration followed by evaporation of the solvent.

The thus produced bismethylenedioxy derivative of 6β-methyl - 16β - fluoro - $\Delta^5$ - pregnene - 11β,17α,21-triol-3,20-dione 3-ethylene ketal is then hydrolyzed as described above to give the 17,20; 20,21-bismethylenedioxy derivative of 6β-methyl-16β-fluoro-hydrocortisone (VI).

The bismethylenedioxy function is then removed by hydrolysis with an aqueous organic acid, such as, formic and acetic acids. In the preferred embodiment of this invention, it is preferred to reflux the bismethylenedioxy derivative for a brief period, generally about 10 to 30 minutes, in 60% formic acid. The crude 6β-methyl-16β-fluoro-corticosteroid crystallizes upon the addition of water and concentration of the reaction mixture and is purified by recrystallization from a suitable organic solvent, such as, isopropyl ether. The 6β-methyl-16β-fluoro-hydrocortisone compound thus obtained consists of the 6α and 6β-fluoro isomers: the 6α-isomer can be separated by chromatographic or crystallization techniques well known in the art, if desired. Conversion of the 6β-epimer or of mixtures consisting essentially of the 6β-epimer to the 6α-epimer is accomplished by treatment of the 6-methyl compound with a prototropic agent, such as, water, alcohols, organic acids and mineral acids. In the preferred embodiment of this invention the 21-acetate of the 6-methyl compound (VII), dissolved in chloroform and absolute methanol, is treated with anhydrous hydrogen chloride at −5° C. to −10° C. for about 3 hours. At the end of this period the reaction mixture is diluted with chloroform, washed successively with sodium bicarbonate and water and evaporated to dryness under reduced pressure. The 6α-methyl-16β-fluoro-hydrocortisone compound (VIII) is then recovered from the crude reaction product and purified by recrystallization.

It should be understood that the remaining reaction sequence applies equally well to the 6α- or the 6β-methyl compounds. The particular 6-methyl substituent used depends only on the final product desired. When, of course, the 6β-methyl isomer of the final product is desired, the isomerization step is omitted.

The 9α-halo and 9α-halo-21-acylate analogues of the 6α-methyl-16β-fluoro corticosteroids represented by the above generic formula are conveniently prepared, for example, by dehydrating 6α-methyl-16β-fluoro-hydrocortisone 21-acetate (VII at the 9(11)-positions. Suitable dehydrating agents are N-bromoacetamide and anhydrous sulfur dioxide in pyridine, methanesulfonyl chloride, p-toluenesulfonyl chloride. In the preferred embodiment of this invention, a pyridine solution of the said 11-hydroxyl compound is treated with a pyridine solution of methanesulfonyl chloride at about 0° C. to −20° C. After one to four hours, the reaction mixture is allowed to come to room temperature and, following several hours at room temperature, is added drop-wise to cold water to precipitate the 6α-methyl-16β-fluoro-$\Delta^{4,9(11)}$-pregnadiene-17α,21-diol-3,20-dione 21-acetate (VIII).

The said $\Delta^{4,9(11)}$-pregnadiene compound is then dissolved in an organic solvent, such as, dioxane, and reacted with a hypohalous acid, such as, hypobromous or hypochlorous acid, or with a hypohalous acid releasing agent in the presence of an acid. Such hypohalous acid releasing agents include N-bromo-acetamide, N-chloroacetamide, N-bromo-succinimide, N-iodosuccinimide, and N-chlorosuccinimide. Such agents permit the formation of a hypohalous acid in situ when treated with aqueous sulfuric acid, perchloric acid, and the like. The reaction is generally conducted at about room temperature using from equimolar up to 25% excess of hypohalous acid releasing agent. At the completion of reaction, generally not over 2 hours, the excess of hypohalous acid is destroyed by the addition of sodium sulfite or hyposulfite. The 9α-halo-11β-hydroxy derivative thus produced is isolated by the addition of water followed by filtration of the precipitated product or extraction with an organic solvent. Purification is accomplished by recrystallization from a suitable organic solvent such as, acetone. In the preferred embodiment of this invention the $\Delta^{4,9(11)}$-pregnadiene derivative is dissolved in dioxane and perchloric acid solution at room temperature, and treated with solid N-bromo-acetamide. The reaction mixture is protected from light and, after 1 hour, the excess perchloric acid is destroyed by the addition of aqueous sodium sulfite. The 6α-methyl-9α-bromo-16β - fluoro-hydrocortisone 21-acetate (IX) is isolated as described above and purified by recrystallization from a suitable organic solvent.

The thus produced bromohydrin is then converted to the corresponding 9β, 11β-oxide by treatment with a mild alkali, such as, potassium acetate, potassium carbonate. In the preferred embodiment of this invention, a dioxane solution of 6α-methyl-9α-bromo-16β-fluoro - hydrocortisone 21-acetate is added to a solution of excess anhydrous potassium acetate in absolute alcohol and the mixture heated to reflux for about 0.5 to about 2 hours. The mixture is cooled, and the product isolated by the addition of a large volume of ice-water. The thus-produced 6α-methyl-9β,11β-oxido-16β-fluoro-$\Delta^4$-pregnene-17α, 21-diol-3,20-dione 21-acetate (X) is then converted to a halohydrin different from the starting halohydrin by treatment with a halogenating agent, such as, hydrogen halide, in a suitable organic solvent. The halogenating agent used may be the gaseous hydrogen halide, a concentrated aqueous solution, or a metal halide which releases hydrogen halide when treated with acids. The anhydrous hydrogen halides are generally preferred since they permit the use of temperatures ranging from 0° C. to 50° C. and relatively short reaction times. The product is recovered by neutralizing the excess hydrogen halide followed by extraction with water immiscible solvents, such as, methylene chloride and ethylene chloride. Evaporation of the organic solvent leaves the crude halohydrin which is purified by recrystallization from a suitable organic solvent.

In the formation of 6α-methyl-9α,16β-difluoro hydrocortisone 21-acetate, the corresponding 9β,11β-epoxide (X) is reacted with hydrogen fluoride to open the epoxide ring and produce the 9α,16β-difluoro-derivative (XI). The epoxide-opening step can be performed under anhydrous or aqueous conditions in the presence or absence of a catalyst, e.g., boron trifluoride. Under anhydrous conditions temperatures between about minus forty and plus fifty degrees centigrade are generally employed, the preferred limits being between about zero and 25 degrees centigrade. If anhydrous conditions are difficult or inconvenient to maintain, the oxide-opening reaction can be performed under aqueous conditions. Thus aqueous hydrofluoric acid is admixed with a solution of the epoxide in an organic solvent such as, for example, methylene chloride, chloroform, benzene, ether, and the like for a period of up to five hours, with one-half to two hours being the preferred reaction time. Room temperature is normally employed, but temperatures of zero to the boiling point of the mixture are operative. In the preferred embodiment of this invention, anhydrous conditions are employed. Thus, anhydrous hydrogen fluoride is passed into a methylene chloride solution of the epoxide at 0° C. to 5° C. After about two hours, the product, 6α-methyl-9α,16β-difluoro-hydrocortisone 21-acetate, (XI) is recovered by evaporation of the solvent.

In a similar manner, the use of hydrogen chloride, hydrogen bromide or hydrogen iodide produce the respective chloro, bromo or iodo derivative.

Oxidation of the said hydrocortisone compound as described above produces 6α-methyl-9α,16β-fluoro-cortisone 21-acetate (XII). Dehydrogenation of the thus produced difluoro-hydrocortisone and difluoro-cortisone compounds is accomplished with excess selenium dioxide in a high boiling inert organic solvent, such as, phenetole, diethylene glycol diethylether, dibutyl cellosolve, xylene, dioxane, and so forth. A tertiary organic base may be added to expedite reaction. In the preferred embodiment of this invention the steroid compound, dibutylcellosolve, a 10 molar excess of selenium dioxide and an equivalent molar quantity of pyridine are refluxed in an atmosphere of nitrogen for several hours. Upon completion of the reaction, the mixture is filtered or decanted, evaporated in vacuo and the product isolated by crystallization from a suitable organic solvent or by chromatography on various adsorbents. In this manner, 6α-methyl-9α,16β - difluoro prednisolone and 6α-methyl-9α,16β-difluoro - prednisone are produced.

In like manner, 6α-methyl-16β-fluoro-prednisolone and 6α-methyl-16β-fluoro-prednisone are produced from 6α-methyl-16β-fluoro-hydrocortisone (VII) and 6α-methyl-16β-fluoro-cortisone (VI) respectively.

The following examples are illustrative of the process and products of this invention, many variations of which are possible without departing from the scope or spirit thereof. It should be remembered that these examples are given primarily by way of illustration and the invention in its broader aspects is not to be restricted to these examples.

EXAMPLE I

*17,20; 20,21-bismethylenedioxy derivative of 3,20-diketo-5α,11α,17α,21-tetrahydroxy-6β-methyl-16β - fluoro - allopregnane 3-ethylene ketal 11-acetate*

A solution of the 17,20; 20,21-bismethylenedioxy derivative of 3,20-diketo-5α,6α-oxido-11α,17α,21-trihydroxy-16β-fluoro-pregnane 3-ethylene ketal 11-acetate (5 g.) in 300 ml. of a 1:1 ether-tetrahydrofuran solution is cooled to 0° to 5° C. and added dropwise to a solution of methylmagnesium bromide (2.5 g.) in 100 ml. of 1:1 ether-tetrahydrofuran solution at 0° to 5° C. over a one hour period. After 20 hours, the solvent is removed by distillation and the residue decomposed by the addition of 100 ml. of ice-water. The product is isolated by ether extraction followed by drying and evaporation of the solvent.

EXAMPLE II

*17,20; 20,21-bismethylenedioxy derivative of 3,20-diketo-5α,11α,17α,21-tetrahydroxy-6β-methyl-16β - fluoro - allopregnane*

A suspension of the product of Example I (5 g.) in 0.25 N methanolic perchloric acid (100 ml.) is shaken at room temperature for 20 hours. Water is then added and the resulting product filtered and washed carefully with sodium acetate solution followed by water. The crude 17,20; 20,21-bismethylenedioxy derivative of 3,20-diketo-5α,11α,17α,21-tetrahydroxy-6β-methyl-16β - fluoro-allopregnane is used directly in the following preparation.

EXAMPLE III

*17,20; 20,21-bismethylenedioxy derivative of 3,11,20-triketo - 5α,17α,21 - trihydroxy - 6β - methyl - 16β-fluoro-allopregnane*

The product of Example II (5 g.) is oxidized in glacial acetic acid (200 ml.) with chromium trioxide (1.2 g.) for 45 minutes. Alcohol (50 ml.) is added and the mixture concentrated to a syrup. The product is isolated with chloroform and the chloroform residue recrystallized from 95% alcohol.

EXAMPLE IV

*6β-methyl-16β-fluoro-cortisone-17,20; 20,21-bismethylenedioxy derivative*

The product of Example III (1,0 g.) is heated to reflux in acetic acid (500 ml.) and water (1.0 ml.) for one hour, then cooled, diluted with 500 ml. of water and evaporated to dryness under reduced pressure. The residue of crude 6β-methyl-16β-fluoro-cortisone 17,20; 20,21-bismethylenedioxy derivative is used directly in the following example.

EXAMPLE V

*17,20; 20,21-bismethylenedioxy derivative of 6β-methyl-16β - fluoro - Δ⁵ - pregnene - 17α,21 - diol - 3,11,20 - trione 3-ethylene ketal*

The product of Example IV (25 g.), benzene (375 ml.) and ethylene glycol (8 ml.) are thoroughly mixed and heated to remove a small amount of water by azeotropic distillation. Paratoluene sulfonic acid monohydrate (1.0 g.) is added and the mixture stirred and refluxed for 20 hours with continuous removal of water. The mixture is then cooled, made basic by the addition of 5% aqueous sodium carbonate, and extracted with a 1:1 solution of benzene to ether. The organic layer is separated, dried over anhydrous magnesium sulfate, filtered and evaporated under reduced pressure to give 6β-methyl-16β-fluoro-Δ⁵-pregnene-17α,21-diol-3,11,20-trione 3-ethylene ketal-17,20; 20,21-bismethylenedioxy derivative.

EXAMPLE VI

*17,20; 20,21-bismethylenedioxy derivative of 6β-methyl-16β - fluoro - Δ⁵ - pregnene - 11β,17α,21 - triol - 3,20-dione 3-ethylene ketal*

To a solution of the product of Example V (50 gms.) in anhydrous ether (22 l.) is gradually added a solution of sodium borohydride (100 gms.) in ether (20 l.) over a period of about 2 hours. Water (2 l.) is then slowly added and the ether phase separated. The aqueous phase is extracted with ethylacetate solution and washed with water, dried and evaporated to dryness under reduced pressure to give 17,20; 20,21-bismethylenedioxy-6β-methyl-16β-fluoro-Δ⁵-pregnene-11β,17α,21-triol-3,20 - dione 3-ethylene ketal.

EXAMPLE VII

*17,20; 20,21-bismethylenedioxy derivative of 6β-methyl-16β-fluoro-hydrocortisone*

Hydrolysis of the product of Example VI with methanolic-perchloric acid according to the procedure of Example II gives the 17,20; 20,21-bismethylenedioxy derivative of 6β-methyl-16β-fluoro-hydrocortisone.

EXAMPLE VIII

*6β-methyl-16β-fluoro-hydrocortisone 21-acetate*

8 g. of the 17,20; 20,21-bismethylenedioxy derivative of 6β-methyl-16β-fluoro-cortisone is refluxed for approximately 30 minutes in 60% of formic acid (1.6 l.). Water (1,200 ml.) is then added and the solution concentrated at room temperature under reduced pressure. The crude 6β-methyl-16β-fluoro-cortisone which crystallizes from the solution is recrystallized from isopropyl ether. Acetylation of the 21-alcohol with acetic anhydride in pyridine produces the corresponding 21-acetate.

EXAMPLE IX

*6α-methyl-16β-fluoro-hydrocortisone 21-acetate*

Into a solution of 6β-methyl-16β-fluoro-hydrocortisone 21-acetate (5 g.) in chloroform (425 ml.) and absolute alcohol (4 ml.) at −5° C. to −10° C., a stream of anhydrous hydrochloric acid is bubbled for about 3 hours. At the end of this period, the solution is diluted with chloroform (750 ml.), washed successively with sodium bicarbonate and water, dried and evaporated to dryness under reduced pressure at 35–45° C. The residue, 6α-methyl-16β-fluoro-cortisone 21-acetate is recrystallized from acetone-Skellysolve B. Acid hydrolysis gives the corresponding 21-alcohol.

EXAMPLE X

*6α-methyl-16β-fluoro-$\Delta^{4,9(11)}$-pregnadiene-17α,21-diol-3,20-dione 21-acetate*

To a solution of the 6α-methyl-16β-fluoro-hydrocortisone 21-acetate (11 g.) in anhydrous pyridine (240 ml.) cooled to 0° C., and protected from atmospheric moisture, is added a solution of methanesulfonyl chloride (20.6 ml.) in chloroform (32 ml.). After about one hour at 0° C., the mixture is allowed to come to room temperature and left standing for ten hours. The solution is then added dropwise to 2.2 l. of ice-water with stirring to precipitate 6α-methyl-16β-fluoro-$\Delta^{4,9(11)}$-pregnadiene-17α,21-diol-3,20-dione 21-acetate. The product is recovered by filtration, dried and recrystallized from ethyl-acetate.

EXAMPLE XI

*6α-methyl-16β-fluoro-9α-bromo-$\Delta^4$-pregnene-11β,17α,21-triol-3,20-dione 21-acetate*

Solid N-bromoacetamide (4.75 g.) is added with stirring to a suspension of 6α-methyl-16β-fluoro-$\Delta^{4,9(11)}$-pregnadiene-17α,21-diol-3,20-dione 21-acetate (10 g.) and 0.46 N perchloric acid (15 ml.) in peroxide-free dioxane (375 ml.) at room temperature over a period of about one hour. The reaction mixture is protected from light during the addition and for an additional hour. 10% aqueous sodium sulfite is added with stirring until KI-starch paper no longer turns blue. Ice (415 g.) and chloroform (1,000 ml.) is added and the layers separated. The chloroform dioxane solution is washed with water, then concentrated to a syrup in vacuo at room temperature. The addition of acetone (425 ml.) to the syrup causes rapid crystallization. The mixture is chilled overnight, then filtered. Additional product is recovered from the filtrate by evaporation to dryness. Recrystallization from acetone gives pure 6α-methyl-16β-fluoro-9α-bromo-$\Delta^4$-pregnene-11β-17α-21-triol-3,20-dione 21-acetate. In like manner, the corresponding 9α-chloro-derivative is prepared.

EXAMPLE XII

*6α-methyl-16β-fluoro-9β,11β-oxido-$\Delta^4$-pregnene-17α,21-diol-3,20-dione 21-acetate*

A solution of 6α-methyl-16β-fluoro-9α-bromo-$\Delta^4$-pregnene-11β,17α,21-triol-3,20-dione 21-acetate (8 g.) in dioxane (260 ml.) is added to a solution of anhydrous potassium acetate (5.5 g.) in absolute alcohol (55 ml.) heated to near reflux temperature. The mixture is heated to reflux for about 45 minutes and then cooled rapidly. The product, 6α-methyl-16β-fluoro-9β,11β-oxido-$\Delta^4$-pregnene-17α,21-diol-3,20-dione-21-acetate, is precipitated by the addition of ice-water and filtered. Concentration of the filtrate permits isolation of additional product.

EXAMPLE XIII

*6α-methyl-9α,16β-difluoro-hydrocortisone 21-acetate*

Approximately 6 g. of anhydrous hydrogen fluoride is passed into a solution of 6α-methyl-16β-fluoro-9β,11β-oxido-$\Delta^4$-pregnene-17α,21-diol-3,20-dione 21-acetate (5 g.) in redistilled chloroform (100 ml.) contained in a polyethylene bottle at 0° C. The mixture becomes an intense red color and separates into two layers. After 1–5 hours at 0° C., the mixture is made weakly alkaline by the addition of sodium bicarbonate solution. The chloroform layer is separated and evaporated to dryness to give the crude 6α-methyl-9α,16β-difluoro-hydrocortisone 21-acetate. The product is recrystallized from ethyl-acetate.

By slight modifications of the above procedure the respective 9α-bromo derivative obtained by this procedure but substituting hydrogen bromide in place of hydrogen fluoride is identical to the 6α-methyl-16β-fluoro-9α-bromo-$\Delta^4$-pregnene-11β,17α,21-triol-3,20-dione-21-acetate obtained in Example XI.

EXAMPLE XIV

*6α-methyl-9α,16β-difluoro-cortisone*

Oxidation of 6α-methyl-9α,16β-difluoro-hydrocortisone 21-acetate with chromium trioxide in acetic acid according to the procedure of Example III produces 6α-methyl-9α,16β-difluoro-cortisone 21-acetate. Hydrolysis according to well known procedures gives the corresponding 21-alcohol.

In like manner, 6α-methyl-16β-fluoro-cortisone is prepared from 6α-methyl-16β-fluoro-hydrocortisone 21-acetate.

EXAMPLE XV

*6α-methyl-9α,16β-difluoro-prednisolone*

A mixture of 6α-methyl-9α,16β-difluoro hydrocortisone 21-acetate (0.1 g.) freshly sublimed selenium dioxide (0.1 g.) and 2 ml. of dibutyl cellosolve is heated in a nitrogen atmosphere for about 10 hours at 175° C. The brown supernatant solution is decanted from the residual solid and cooled to room temperature. The addition of low boiling petroleum ether precipitates 6α-methyl-9α,16β-difluoro-prednisolone 21-acetate which is purified by chromatographic separation on a Florisil (synthetic magnesium silicate) column. Acid hydrolysis according to conventional procedures gives 6α-methyl-9α,16β-difluoro-prednisolone.

In like manner, 6α-methyl-16β-fluoro-prednisone; 6α-methyl-16β-fluoro-prednisolone; 6α-methyl-9α,16β-difluoro-prednisone are prepared.

EXAMPLE XVI

A variety of 21-esters of the 6α-methyl-16β-fluorinated corticosteroid products are prepared using acyl chlorides or acyl anhydrides as acylating agents in accordance with conventional methods. These include such esters as the formate, the propionate, the isobutyrate, the hexanoate, the octanoate, the benzoate and the succinate.

What is claimed is:
1. 6α-methyl-16β-fluoro-cortisone.
2. 6α-methyl-16β-fluoro-prednisone.
3. 6α-methyl-9α,16β-difluoro-hydrocortisone.
4. 6α-methyl-9α,16β-difluoro-cortisone.
5. 6α-methyl-9α,16β-difluoro-prednisolone.
6. 6α-methyl-9α,16β-difluoro-prednisone.

7. 6α-methyl-16β-fluoro-Δ⁴,⁹⁽¹¹⁾ - pregnadiene - 17α,21-diol-3,20-dione.

8. The 17,20; 20,21-bismethylenedioxy derivative of 3,20-diketo-5α,11α,17α,21-tetrahydroxy-6β - methyl-16β-fluoro-allopregnane 3-ethylene ketal 11-acetate.

9. 6α-methyl-9β,11β-oxido - 16β - fluoro-Δ⁴-pregnene-17α,21-diol-3,20-dione 21-acetate.

10. 6α-methyl-16β-fluoro-Δ⁴,⁹⁽¹¹⁾ - pregnadiene-17α,21-diol-3,20-dione-21-acetate.

11. A compound selected from the group consisting of

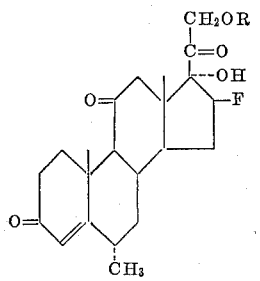

and

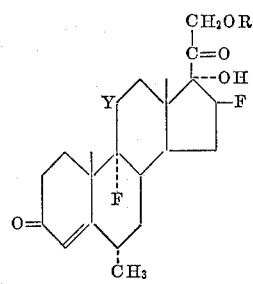

and the corresponding 1,2-dehydro derivatives thereof; wherein R is selected from the group consisting of hydrogen and acyl radical of a hydrocarbon carboxylic acid; Y is selected from the group consisting of the β-hydroxy methylene

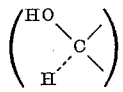

and carbonyl (>C=O) radicals.

12. A 16β-fluoro steroid selected from the group consisting of those of the formula

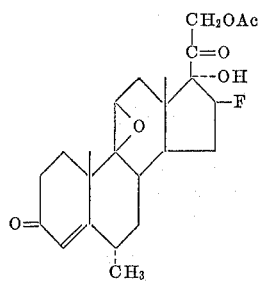

and the corresponding 1,2-dehydro derivatives thereof; wherein Ac is the acyl radical of a hydrocrabon carboxylic acid containing from 1 to 8 carbon atoms.

13. A 16β-fluoro steroid selected from the group consisting of those of the formula

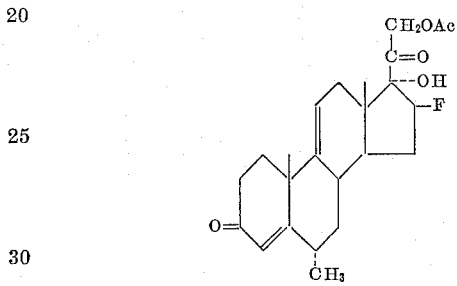

and the corresponding 1,2-dehydro derivatives thereof; wherein Ac is the acyl radical of a hydrocarbon carboxylic acid.

References Cited by the Examiner
UNITED STATES PATENTS
2,781,366 2/1957 Schneider _____ 260—397.45

OTHER REFERENCES
Bowers et al.: "J.A.C.S.," vol. 80 (1958), pp. 3091–93 relied on.
Edwards et al.: "J.A.C.S.," vol. 81 (1959), pp. 3156–57 relied on.

LEWIS GOTTS, *Primary Examiner.*
LESLIE H. GASTON, MORRIS LIEBMAN, *Examiners.*